US009505025B2

(12) United States Patent
Comeau et al.

(10) Patent No.: US 9,505,025 B2
(45) Date of Patent: Nov. 29, 2016

(54) GOLF BALLS INCORPORATING LIGHT-STABLE AND DURABLE COVER COMPOSITIONS

(71) Applicant: Acushnet Company, Fairhaven, MA (US)

(72) Inventors: Brian Comeau, Berkley, MA (US); Michael Michalewich, Mansfield, MA (US); Shawn Ricci, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 51 days.

(21) Appl. No.: 14/178,347

(22) Filed: Feb. 12, 2014

(65) Prior Publication Data

US 2015/0224367 A1 Aug. 13, 2015

(51) Int. Cl.
| | |
|---|---|
| A63B 37/12 | (2006.01) |
| C08G 18/79 | (2006.01) |
| C08G 18/10 | (2006.01) |
| B05D 3/00 | (2006.01) |
| A63B 37/00 | (2006.01) |
| C08G 18/78 | (2006.01) |
| A63B 45/00 | (2006.01) |

(52) U.S. Cl.
CPC ........... *B05D 3/002* (2013.01); *A63B 37/0023* (2013.01); *A63B 37/0024* (2013.01); *A63B 37/0027* (2013.01); *A63B 37/0031* (2013.01); *A63B 37/0033* (2013.01); *A63B 37/0037* (2013.01); *A63B 37/0043* (2013.01); *A63B 37/0062* (2013.01); *A63B 37/0064* (2013.01); *A63B 37/0075* (2013.01); *A63B 37/0087* (2013.01); *A63B 37/0092* (2013.01); *C08G 18/10* (2013.01); *C08G 18/7837* (2013.01); *A63B 37/0039* (2013.01); *A63B 37/0076* (2013.01); *A63B 45/00* (2013.01); *A63B 2037/0079* (2013.01)

(58) Field of Classification Search
None
See application file for complete search history.

(56) References Cited

U.S. PATENT DOCUMENTS

| | | | |
|---|---|---|---|
| 5,334,673 A | 8/1994 | Wu | |
| 5,484,870 A | 1/1996 | Wu | |
| 6,083,119 A | 7/2000 | Sullivan et al. | |
| 6,103,822 A | 8/2000 | Housel et al. | |
| 6,117,025 A | 9/2000 | Sullivan | |
| 6,340,503 B1 | 1/2002 | Simonds et al. | |
| 6,435,986 B1 | 8/2002 | Wu et al. | |
| 6,476,176 B1 | 11/2002 | Wu | |
| 6,506,851 B2 | 1/2003 | Wu | |
| 6,610,812 B1 | 8/2003 | Wu et al. | |
| 6,685,579 B2 | 2/2004 | Sullivan | |
| 6,736,737 B2 | 5/2004 | Higuchi et al. | |
| 6,867,279 B2 | 3/2005 | Wu | |
| 6,903,178 B2 | 6/2005 | Wu et al. | |
| 6,958,379 B2 | 10/2005 | Wu et al. | |
| 6,960,630 B2 | 11/2005 | Cavallaro et al. | |
| 6,964,621 B2 | 11/2005 | Bulpett et al. | |
| 7,014,574 B2 | 3/2006 | Wu et al. | |
| 7,037,985 B2 | 5/2006 | Kim et al. | |
| 7,041,769 B2 | 5/2006 | Wu et al. | |
| 7,105,623 B2 | 9/2006 | Wu et al. | |
| 7,131,915 B2 | 11/2006 | Sullivan et al. | |
| 7,157,545 B2 * | 1/2007 | Wu ................... | A63B 37/0003 473/354 |
| 7,186,777 B2 | 3/2007 | Wu et al. | |
| 7,232,859 B2 | 6/2007 | Argyropoulos et al. | |
| 7,387,581 B2 | 6/2008 | Higuchi et al. | |
| 7,481,956 B2 | 1/2009 | Wu et al. | |
| 7,510,488 B2 | 3/2009 | Higuchi et al. | |
| 7,649,072 B2 | 1/2010 | Wu et al. | |
| 7,786,212 B2 | 8/2010 | Wu et al. | |
| 7,888,449 B2 | 2/2011 | Wu et al. | |
| 2002/0049297 A1 | 4/2002 | Suzuki et al. | |
| 2004/0018894 A1 * | 1/2004 | Kennedy, III | ..... A63B 37/0003 473/376 |
| 2005/0143525 A1 | 6/2005 | Wu et al. | |
| 2005/0228160 A1 | 10/2005 | Wu et al. | |
| 2005/0272530 A1 | 12/2005 | Wu | |

(Continued)

FOREIGN PATENT DOCUMENTS

| | | | |
|---|---|---|---|
| GB | 994890 | * | 6/1965 |
| JP | 2003292564 | * | 10/2003 |

OTHER PUBLICATIONS

R. Xie et al., "Polyurethane Elastomers Based on 1,3 and 1,4-Bis(isocyantomethyl)cyclohexane", Presented May 1, 2008.

(Continued)

*Primary Examiner* — David Buttner
(74) *Attorney, Agent, or Firm* — Margaret C. Barker

(57) ABSTRACT

A golf ball comprising: a core; a casing layer surrounding the core; and a cover layer surrounding the casing layer and being formed from a cover composition that is produced by a reaction of a prepolymer and a chain extender, wherein the prepolymer is formed from the reaction product of: (i) an isocyanate comprising an allophanate ("ICA") and having an average NCO functionality in the range of 1.9 to 2.8 and (ii) a polyol-containing component or an amine-containing component or a blend thereof; and wherein the chain-extender is selected from the group consisting of amine-terminated chain-extenders, hydroxyl-terminated chain-extenders, and mixtures thereof. The ICA may comprise a reaction product of hexamethylene diisocyanate (HDI), at least one monoalcohol, and a bismuth-containing catalyst. The ICA may have an average equivalent weight of from about 200 to about 350; and the prepolymer may have an average equivalent weight of from about 420 to about 840. The cover has a thickness of at least about 0.010 in. and a flexural modulus of about 10,000 psi or greater.

20 Claims, No Drawings

(56) References Cited

U.S. PATENT DOCUMENTS

| | | |
|---|---|---|
| 2006/0009309 A1 | 1/2006 | Rajagopalan et al. |
| 2007/0265388 A1 | 11/2007 | Argyropoulos et al. |
| 2007/0270242 A1 | 11/2007 | Keller et al. |
| 2008/0090678 A1 | 4/2008 | Kim et al. |
| 2009/0008831 A1* | 1/2009 | Bulpett .............. A63B 37/0003 264/446 |
| 2009/0105013 A1 | 4/2009 | Slagel et al. |
| 2009/0192262 A1 | 7/2009 | Melzer et al. |
| 2011/0033712 A1 | 2/2011 | Xie et al. |
| 2011/0190075 A1 | 8/2011 | Ricci et al. |
| 2011/0207556 A1 | 8/2011 | Rajagopalan et al. |
| 2012/0016073 A1 | 1/2012 | Bernard et al. |
| 2012/0035001 A1 | 2/2012 | Xie |
| 2012/0286449 A1 | 11/2012 | Michalewich et al. |

OTHER PUBLICATIONS

European Polymer Journal; Jornal 39 (2003) 1281-1290; Studies on allophanate-urethane networks based on hydroxyl terminated polybutadiene: effect of isocyanate type of the network characteristics; V. Sekkar, S. Gopalakrishnana and Ambika Devi.

Croda product literature for Priplast; dated 2000.

Vencorex Chemicals, flopower, Tolonate x FLO 100 Bio-based & low viscosity aliphatic isocyanate polymer.

Aliphatic polyisocyanates, Desmodur, Bayer.

* cited by examiner

GOLF BALLS INCORPORATING LIGHT-STABLE AND DURABLE COVER COMPOSITIONS

FIELD OF THE INVENTION

The present invention relates generally to golf balls incorporating covers formed from polyurethane and/or polyurea compositions which demonstrate light-stability and shear-resistance/durability.

BACKGROUND OF THE INVENTION

Multi-piece solid golf balls having a core, cover with a casing layer disposed there between are popular today in the golf industry. The core is made commonly of a rubber material such as natural and synthetic rubbers, styrene butadiene, polybutadiene, cis-polyisoprene, or trans-polyisoprene. Often, the casing layer is made of an olefin-based ionomer resin that imparts hardness to the ball. These ionomer acid copolymers contain inter-chain ionic bonding, and are generally made of an α-olefin such as ethylene and a vinyl comonomer having an acid group such as methacrylic, acrylic acid, or maleic acid. Metal ions such as sodium, lithium, zinc, and magnesium are used to neutralize the acid groups in the copolymer. Commercially available olefin-based ionomer resins are used in different industries and include numerous resins sold under the trademarks, Surlyn® (available from DuPont), Iotek® (available from ExxonMobil), Amplify IO® (available from Dow Chemical) and Clarix® (available from A. Schulman). Olefin-based ionomer resins are available in various grades and identified based on the type of base resin, molecular weight, and type of metal ion, amount of acid, degree of neutralization, additives, and other properties. The cover of conventional golf balls are made from a variety of materials including olefin-based ionomers, polyamides, polyesters, and thermoplastic and thermoset polyurethane and polyurea elastomers.

In recent years, there has been high interest in using thermoset, castable polyurethanes (and polyureas) to make cores, casings (or intermediate layer), and/or cover layers. Basically, polyurethane compositions contain urethane linkages formed by reacting an isocyanate group (—N=C=O) with a hydroxyl group (OH). Polyurethanes are produced by the reaction of a multi-functional isocyanate with a polyol, optionally in the presence of a catalyst and other additives. The chain length of the polyurethane prepolymer is extended by reacting it with a hydroxyl-terminated curing agent.

Polyurea compositions, which are distinct from the above-described polyurethanes, also can be formed. In general, polyurea compositions contain urea linkages formed by reacting an isocyanate group (—N=C=O) with an amine group (NH or $NH_2$). The chain length of the polyurea prepolymer is extended by reacting the prepolymer with an amine curing agent. Hybrid compositions containing urethane and urea linkages also may be produced. For example, a polyurea/urethane hybrid composition may be produced when a polyurea prepolymer is reacted with a hydroxyl-terminated curing agent. In another example, when a polyurethane prepolymer is reacted with amine-terminated curing agents during the chain-extending step, any excess isocyanate groups in the prepolymer will react with the amine groups in the curing agent. The resulting polyurethane composition contains urethane and urea linkages and may be referred to as a polyurethane/urea hybrid as discussed further below.

Golf ball covers made from polyurethane and polyurea compositions are generally known in the industry. In recent years, polyurethane and polyurea cover materials have become more popular, because they provide the golf ball covers with a desirable combination of "hard" and "soft" features. The relative hardness of the cover protects the ball from being cut, abraded, and otherwise damaged. In addition, such harder-covered golf balls generally reach a higher velocity when struck by a club. As a result, such golf balls tend to travel a greater distance, which is particularly important for driver shots off the tee. Meanwhile, the relative softness of the cover provides the player with a better "feel" when he/she strikes the ball with the club face. The player senses more control over the ball as the club face makes impact. Such softer-covered balls tend to have better playability. The softer cover allows players to place a spin on the ball and better control its flight pattern. This is particularly important for approach shots near the green. Polyurethane and polyurea covered golf balls are described in the patent literature, for example, U.S. Pat. Nos. 5,334,673; 5,484,870; 6,476,176; 6,506,851; 6,867,279; 6,958,379; 6,960,630; 6,964,621; 7,041,769; 7,105,623; 7,131,915; and 7,186,777.

As discussed above, isocyanates with two or more functional groups are essential components in producing polyurethane and polyurea polymers. These isocyanate materials can be referred to as multi-functional isocyanates. Such isocyanates can be referred to as monomers or monomeric units, because they can be polymerized to produce polymeric isocyanates containing two or more monomeric isocyanate repeat units.

Aromatic isocyanates are normally used for several reasons including their high reactivity and cost benefits. Examples of conventional aromatic isocyanates include, but are not limited to, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PDI), m-phenylene diisocyanate (PDI), naphthalene 1,5-diisocynate (NDI), naphthalene 2,4-diisocyanate (NDI), p-xylene diisocyanate (XDI), and homopolymers and copolymers thereof. The aromatic isocyanates are able to react with the hydroxyl or amine compounds and form a durable and tough polymer having a high melting point. The resulting polyurethane or polyurea material generally has good mechanical strength and cut/shear resistance.

However, one disadvantage with using aromatic isocyanates is the polymeric reaction product tends to have poor light stability and may discolor upon exposure to light, particularly ultraviolet (UV) light. Because aromatic isocyanates are used as a reactant, some aromatic structures may be found in the reaction product. UV light rays can cause quinoidation of the benzene rings resulting in yellow discoloration. Hence, UV light stabilizers are commonly added to the formulation, but the covers may still discolor or develop a yellowish appearance over prolonged exposure to sunlight. Thus, golf balls are normally painted with a white paint or other desirable color and then covered with a transparent coating to protect the ball's appearance.

In a second approach, aliphatic isocyanates are used to form the prepolymer. Examples of aliphatic isocyanates include, but are not limited to, isophorone diisocyanate (IPDI), 1,6-hexamethylene diisocyanate (HDI), 4,4'-dicyclohexylmethane diisocyanate ("$H_{12}$ MDI"), and homopolymers and copolymers thereof. These aliphatic isocyanates can provide polyurethane and polyurea materials having generally good light stability. However, such polymers tend to have reduced mechanical strength and cut/shear-resistance.

As discussed above, golf ball covers having good light stability are needed. One objective of this invention is to develop a golf ball incorporating a cover having good light stability and meanwhile not sacrificing important mechanical properties such as shear-resistance/durability. Accordingly, it would be beneficial to develop polyurethane and/or polyurea compositions possessing such desirable properties. The present invention addresses and solves these needs.

SUMMARY OF THE INVENTION

Thus, a golf ball of the invention comprises: a core; a casing layer surrounding the core; and a cover layer surrounding the casing layer and being formed from a cover composition PC that is produced by a reaction of a prepolymer and a chain extender, wherein the prepolymer is formed from the reaction product of: (i) an isocyanate comprising an allophanate ("ICA") and having an average NCO functionality in the range of 1.9 to 2.8 and (ii) a polyol-containing component; and wherein the chain extender is selected from the group consisting of amine-terminated chain extenders, hydroxyl-terminated chain extenders, and mixtures thereof. By the term, "NCO functionality in the range of 1.9 to 2.8," it is meant that the polyisocyanates have an average of 1.9 to 2.8 NCO groups per molecule.

In another embodiment, a golf ball of the invention comprises a core; a casing layer surrounding the core; and a cover layer surrounding the casing layer and being formed from a cover composition AC that is produced by a reaction of a prepolymer and a chain extender, wherein the prepolymer is formed from the reaction product of: (i) an isocyanate comprising an allophanate ("ICA") and having an average NCO functionality in the range of 1.9 to 2.8 and (ii) an amine-containing component; and wherein the chain extender is selected from the group consisting of amine-terminated chain extenders, hydroxyl-terminated chain extenders, and mixtures thereof.

In one embodiment, the ICA comprises a reaction product of hexamethylene diisocyanate (HDI), at least one monoalcohol, and a bismuth-containing catalyst to form an isocyanate comprising an allophanate. In one embodiment, the monoalcohol is selected from the group consisting of: ethoxylated $C_{12}$-$C_{14}$ alcohols, ethoxylated $C_{16}$-$C_{18}$ alcohols, and ethoxylated $C_{10}$-$C_{16}$ alcohols.

In one embodiment, the ICA has an average NCO functionality in the range of from about 1.9 to about 2.1. In another embodiment, the ICA has an average NCO functionality in the range of from about 1.9 to about 2.3. In yet another embodiment, the ICA has an average NCO functionality in the range of from about 1.9 to about 2.5. In still another embodiment, the ICA has an average NCO functionality in the range of from about 1.9 to about 2.7. In a different embodiment, the ICA has an average NCO functionality in the range of from about 2.0 to about 2.3. In an alternative embodiment, the ICA has an average NCO functionality in the range of from about 2.0 to about 2.2.

In one embodiment, the ICA has an average equivalent weight of from about 200 to about 350. In another embodiment, the ICA has an average equivalent weight of from about 200 to about 240. In yet another embodiment, the ICA has an average equivalent weight of from about 210 to about 300. In still another embodiment, the ICA has an average equivalent weight of from about 275 to about 340. In a different embodiment, the ICA has an average equivalent weight of from about 301 to about 330. In an alternative embodiment, the ICA has an average equivalent weight of from about 320 to about 330. In a particular embodiment, the ICA has an average equivalent weight of about 325.

Non-limiting examples of suitable ICA's include Tolonate®X FLO 100, a two functional HDI based allophonate available from Vencorex and DESMODUR®XP2580 available from Bayer Material Science.

In one embodiment, the prepolymer has an average equivalent weight of from about 420 to about 840. In another embodiment, the prepolymer has an average equivalent weight of from about 420 to about 700, In yet another embodiment, the prepolymer has an average equivalent weight of from about 450 to about 650. In still another embodiment, the prepolymer has an average equivalent weight of from about 475 to about 625. In an alternative embodiment, the prepolymer has an average equivalent weight of from about 500 to about 600. In a different embodiment, the prepolymer has an average equivalent weight of from about 550 to about 575.

In one embodiment, the amine-terminated chain extender is selected from the group consisting of 4,4'-diamino-diphenylmethane; 3,5-diethyl-(2,4- or 2,6-)toluenediamine; 3,5-dimethylthio-(2,4- or 2,6-)toluenediamine; 3,5-(1,4- or 2,6-) toluenediamine; 2,2'-dichloro-3,3',5,5'-tetraethyl-4,4'-diamino-diphenylmethane; polytetramethyleneglycol-di(p-aminobenzoate); 4,4'-bis(sec-butylamino)-dicyclohexylmethane; and mixtures thereof.

In one embodiment, the hydroxyl-terminated chain-extender is selected from the group consisting of ethylene glycol, diethylene glycol, polyethylene glycol, propylene glycol, polytetramethylene ether glycol, polyethylene propylene glycol, polyoxypropylene glycol, 2-methyl-1,3-propanediol, 1,4-butanediol, 2-methyl-1,4-butanediol, and mixtures thereof.

Cover compositions PC, AC or blends thereof have many advantages including improved light-stability and shear resistance/durability and may be incorporated in a wide range of different golf ball constructions for achieving tailored compression, "feel," and spin. In one embodiment of a golf ball of the invention, the core has a surface hardness H of from about 50 Shore C to about 90 Shore C and a center hardness CH of from about 50 Shore C to about 90 Shore C; the casing layer has a surface hardness A of from about 45 Shore D to about 80 Shore D; and the cover has a surface hardness B of from about 65 Shore C to about 90 Shore C.

In one embodiment, H is greater than CH. In another embodiment, CH is greater than H. In yet another embodiment H and CH are substantially the same.

In one embodiment, the core may be a single core, comprising a substantially homogenous composition and having a geometric center and an outer surface. Alternatively, the core may comprise a center and at least one outer core layer formed about the center, typically called a "dual core" arrangement. In the "dual core" arrangement, surface hardness H is an outer surface hardness of the outermost core layer.

In another embodiment, CH is from about 65 Shore C to about 75 Shore C, H is from about 65 Shore C to about 75 Shore C, A is from about 60 Shore D to about 75 Shore D, and B is from about 75 Shore C to about 88 Shore C. In yet another embodiment, CH is from about 68 Shore C to about 72 Shore C. H is from about 65 Shore C to about 75 Shore C, A is from about 64 Shore D to about 69 Shore D, and B is from about 80 Shore C to about 84 Shore C. In still another embodiment, CH is from about 69 Shore C to about 71 Shore C, H is from about 65 Shore C to about 75 Shore C, A is from about 65 Shore D to about 68 Shore D and B is from about 81 Shore C to about 83 Shore C.

Additional examples of golf balls of the invention incorporating cove compositions PC and/or AC formed from an ICA are as follows. In one construction, CH is from about 45 Shore C to about 55 Shore C, H is from about 75 Shore C to about 85 Shore C, A is from about 65 Shore D to about 75 Shore D, and B is from about 77 Shore C to about 83 Shore C. In another embodiment, CH is from about 48 Shore C to about 52 Shore C, H is from about 78 Shore C to about 82 Shore C, A is from about 68 Shore D to about 72 Shore D, and B is from about 78 Shore C to about 82 Shore C. In yet another example, CH is from about 70 Shore C to about 74 Shore C, is from about 84 Shore C to about 88 Shore C, A is from about 66 Shore D to about 70 Shore D, and B is from about 79 Shore C to about 83 Shore C. In still another embodiment, CH is from about 63 Shore C to about 67 Shore C, is from about 86 Shore C to about 90 Shore C, A is from about 65 Shore D to about 75 Shore D, and B is from about 79 Shore C to about 83 Shore C. In a different embodiment, CH is from about 48 Shore C to about 52 Shore C, H is from about 84 Shore C to about 89 Shore C, A is from about 63 Shore D to about 66 Shore D, and B is from about 79 Shore C to about 83 Shore C.

The USGA has established a maximum weight of 1.62 ounces (45.93 g) for golf balls. For play outside of USGA rules, the golf balls can be heavier. In one preferred embodiment, the weight of the multi-layered core is in the range of about 28 to about 38 grams. Also, golf balls made in accordance with this invention can be of any size, although the USGA requires that golf balls used in competition have a diameter of at least 1.68 inches. For play outside of United States Golf Association (USGA) rules, the golf balls can be of a smaller size. Normally, golf balls are manufactured in accordance with USGA requirements and have a diameter in the range of about 1.68 to about 1.80 inches. However, it is envisioned that golf balls of the invention may also have a diameter of greater than 1.80 inches.

In a golf ball of the invention, the cover has a thickness of 0.010 inches (in.) or greater. In one embodiment, the cover has a thickness of from about 0.020 in. to about 0.050 in. In another embodiment, the cover has a thickness of from about 0.015 in. to about 0.030 in. In yet another embodiment, the cover has a thickness of from about 0.020 in. to about 0.040 in. In still another embodiment, the cover has a thickness of from about 0.030 in. to about 0.050 in. In an alternative embodiment, the cover has a thickness of from about 0.10 in. to about 0.025 in. In a different embodiment, the cover has a thickness is greater than about 0.050 in.

In one embodiment of a golf ball of the invention, the core has a diameter of from about 1.26 inches to about 1.60 inches, the cased core has a diameter of from about 1.580 inches to about 1.640 inches, and the cover has a thickness of from about 0.020 inches to about 0.050 inches.

It is contemplated that the core and cased core may have any diameter, which when combined with the thickness of the cover, produces a finished golf ball having a compression of from about 40 to about 120, or from about 65 to about 110, or from about 60 to about 100. For example, in one embodiment, the core comprises a center having a diameter of from 0.100 inches to 1.100 inches and an outer core layer having a thickness of from 0.200 inches to 1.200 inches. In another embodiment, the core is a single core having an outer diameter of about 1.51 inches to about 1.59 inches and having an outer surface and a geometric center.

In one embodiment, a golf ball of the invention has a coefficient of restitution (COR) of at least about 0.780. In another embodiment, a golf ball of the invention has a COR of at least about 0.790. In yet another embodiment, a golf ball of the invention has a COR of at least about 0.800. In still another embodiment, a golf ball of the invention has a COR of at least about 0.810.

In one embodiment, the outer core layer is an intermediate layer. The outer core layer/intermediate layer may be formed from a thermoplastic composition selected from the group consisting of ionomers; polyesters; polyester-ether elastomers; polyester-ester elastomers; polyamides; polyamide-ether elastomers, and polyamide-ester elastomers; polyurethanes, polyureas, and polyurethane-polyurea hybrids and mixtures thereof. The intermediate layer may also be formed from a thermoset composition selected from the group consisting of polyurethanes, polyureas, and polyurethane-polyurea hybrids, epoxies, and mixtures thereof.

In one construction, the golf ball includes a polybutadiene core, a casing layer formed about the core and comprising an ionomer resin, and a cover layer surrounding the casing layer formed from at least one of cover composition PC and AC. Of course, golf balls made in accordance with this invention may have various constructions. For example, the cover may comprise one or more layers. In an embodiment wherein the cover comprises at least two layers, at least one of the cover layers comprises the cover composition. In a preferred embodiment, the outermost cover layer comprises the cover composition since the cover composition has good light stability and is a durable material.

In yet another embodiment, a method for making a golf ball of the invention comprises: providing a core; providing a casing layer about the core; and forming a cover layer about the casing layer, the cover layer being formed from a cover composition PC that is produced by a reaction of a prepolymer and a chain extender, wherein the prepolymer is formed from the reaction product of: (i) an isocyanate comprising an allophanate ("ICA") and having an average NCO functionality in the range of 1.9 to 2.8 and (ii) a polyol-containing component; and wherein the chain extender is selected from the group consisting of amine-terminated chain extenders, hydroxyl-terminated chain extenders, and mixtures thereof.

In still another embodiment, a method for making a golf ball of the invention comprises: providing a core; providing a casing layer about the core; and forming a cover layer about the casing layer, the cover layer being formed from cover composition AC that is produced by a reaction of a prepolymer and a chain extender, wherein the prepolymer is formed from the reaction product of: (i) an isocyanate comprising an allophanate ("ICA") and having an average NCO functionality in the range of 1.9 to 2.8 and (ii) an amine-containing component; and wherein the chain extender is selected from the group consisting of amine-terminated chain extenders, hydroxyl-terminated chain extenders, and mixtures thereof.

In a golf ball of the invention, the resulting cover has a flexural modulus of about 10,000 psi or greater, or a flexural modulus of about 15,000 psi or greater, or a flexural modulus of about 20,000 psi or greater, as measured in accordance with ASTM method D-790. In other embodiments, the cover of a golf ball of the invention has a flexural modulus of from about 10,000 psi to about 50,000 psi, or from about 10,000 psi to about 30,000 psi, or from about 10,000 psi to about 20,000 psi.

DETAILED DESCRIPTION OF THE PREFERRED EMBODIMENTS

The following prophetic examples illustrate some of the benefits provided by a golf ball of the invention over conventional golf balls. A golf ball of the invention incorporating a cover formed from cover compositions PC and/or AC possesses desirable color stability and shear durability. In this regard, TABLE I below displays the formulations, and TABLE II displays the properties, for one inventive golf ball cover Ex. 1 and three comparative prophetic golf ball covers Comp. Ex. 1, Comp. Ex. 2 and Comp. Ex. 3:

TABLE 1

| Golf Ball Layer Formulation | Ex. 1 | Comp. Ex. 1 | Comp. Ex. 2 | Comp. Ex. 3 |
|---|---|---|---|---|
| Tolonate XFLO 100[1] (Aliphatic) | 62.92 | 0 | 0 | 0 |
| Desmodur N-3400[2] (Aliphatic) | 0 | 0 | 35.1 | 0 |
| Desmodur N-3200[3] (Aliphatic) | 0 | 0 | 0 | 33.41 |
| Mondur M[4] (Aromatic) | 0 | 23.57 | 0 | 0 |
| PTMEG 2000[5] | 18.71 | 59.75 | 50.11 | 51.8 |
| Ethacure 100-LC[6] | 14.79 | 0 | 11.21 | 11.21 |
| Ethacure 300[7] | 0 | 13.11 | 0 | 0 |
| TiO2 Pigment Dispersion[8] | 3.58 | 3.57 | 3.58 | 3.58 |

[1]Tolonate X FLO 100 is a two functional HDI based allophonate available from Vencorex.
[2]Desmodur N-3400 is an HDI based dimer/trimer available from Bayer Material Science.
[3]Desmodur N-3200 is an HDI based biuret available from Bayer Material Science.
[4]Mondur M is 4,4'-MDI available from Bayer Material Science.
[5]PTMEG 2000 is polytetramethylene ether glycol of an average molecular weight of 2000 g/mol. available from Invista, BASF, and Diaren Chemical for example.
[6]Ethacure 100-LC is diethyltoluene diamine sold by Albemarle.
[7]Ethacure 300 is dimethylthiotoluene diamine sold by Albemarle.
[8]TiO$_2$ pigment dispersion is 56% weight loading of TiO$_2$ in a long chain triol from PolyOne.

As is shown in TABLE I above, prophetic covers Ex. 1, Comp. Ex. 1, Comp. Ex. 2 and Comp. Ex. 3 are notably different in that cover Ex. 1 is formed from a two functional HDI based allophonate, whereas cover Comp. Ex. 1 is formed from aromatic 4,4'-MDI, and covers Comp. Ex. 2 and Comp. Ex. 3 are multi-component aliphatic polyisocyanates. Otherwise, each of the examples includes a diamine, TiO$_2$ pigment, and polytetramethylene ether glycol.

As demonstrated in TABLE II below, a golf ball formed from a cover composition as disclosed and claimed herein is superior as favorably simultaneously possessing and displaying both good light stability and good shear resistance/durability:

TABLE II

| Characteristic Tested | Ex. 1 | Comp. Ex. 1 | Comp. Ex. 2 | Example 3 |
|---|---|---|---|---|
| Light Stability | Good | Poor | Good | Good |
| Shear Durability | Good | Good | Fair | Poor |

In contrast, each of the comparative covers is deficient with respect to either light stability or shear durability. Specifically, the aromatic 4,4'-MDI-based cover of Comp. Ex. 1 demonstrates poor light stability, the aliphatic polyisocyanate of cover Comp. Ex. 2 demonstrates only fair shear durability, and the aliphatic polyisocyanate of Comp. Ex. 3 demonstrates poor shear durability.

Regarding light stability, one of ordinary skill in the art would recognize that it is important to have a cover composition that retains its color with the passage of time. That is, its color remains similar to the initial material color. The color instability caused by both thermo-oxidative degradation and photodegradation typically results in a "yellowing" or "browning" of the polyurethane layer, an undesirable characteristic for urethane compositions are to be used in the covers of golf balls.

It is well known to one of ordinary skill in the art that the human visual system, which consists of rods that are sensitive to lightness and darkness (white and black, respectively), and cones that respond to color, can be simulated using mathematical models. All existing models derive values from a visible spectrum of a material that can be obtained from a color spectrometer (or colorimeter), that measures the intensity of reflected light (for opaque samples) in the region of the electromagnetic spectrum visible to humans (approximately 400 to 740 nm).

The CIELCh and CIELAB systems are standard color systems well known in the art of color and appearance to describe the effective "color" of an object. The differences in color between a reference and a test specimen can easily be expressed in terms of the CIELCh or CIELAB values which indicate both magnitude and direction of color difference. Therefore, either the CIELCh or CIELAB systems can be used to measure the color of the polyurethane compositions of the invention. The CIELCh scale separates the "color" of a sample into three parameters on a cylindrical polar coordinate system. In the CIELCh system, L* defines the darkness or lightness, (black and white) component of a sample. For example, an L* value of 100 is pure white, or completely reflective at all wavelengths, whereas an L* value of 0 is pure black, or absorbing all wavelengths of light. C*, however, is a measure of chroma (saturation) and is a vector distance from the center (L* axis) of the color space. Hue (h°) is the third parameter and is represented as an angle ranging from 0° to 360°, where 0°=red, 90°, yellow 180°=green, and 270°=blue.

It has been determined that, as an unpainted golf ball cover ages during normal usage due to exposure to UV light, the L* values decrease (become darker) and the C* values increase. The hue tends to remain near 90° (i.e., yellow), and may drift slightly higher into the greenish yellow or slightly lower into the reddish yellow. This is a relatively subtle and less visually perceptible change than the increase in chroma, C*. Since the C* increase is essentially traveling along a hue angle of 90°, a larger C* value, in this case, can be thought of as more yellow. Thus, for the purposes of this invention, it is desirable to minimize the initial C* value (less yellow) of the unpainted cover and also inhibit or prevent C* increase over time, the C* rate of increase, or preferably both, due to exposure to UV radiation, for example. It is also desirable to maximize the initial L* (towards white) value and inhibit or prevent its decrease towards black over time due to exposure to UV or other radiation having a similarly disadvantageous effect on the appearance of golf balls.

Table II above reveals that the cover materials of golf balls Ex. 1, Comp. Ex. 2 and Comp. Ex. 3 may exhibit good color retention and therefore, color change occurs at a favorably slower rate than the material of Comp. Ex. 2.

Shear resistance is a golf ball's ability to withstand the shear force applied to a ball when hit with a golf club and/or iron. When the grooves on the striking surface of a golf club and/or iron impact a golf ball in a downward oblique swing causing it to slide upward across the face, and immediately forcibly propelled in an outbound trajectory from, the particular club face, the shear force applied to the golf ball cover often produces cuts or abrasion marks on the surface of the cover material of the golf ball. The shear resistance of each golf ball may be evaluated by any procedure known in the art for evaluating durability. For example, low handicap golfers can be used to repeatedly hit a golf ball upon which any damage to the cover is evaluated and rated. TABLE I above demonstrates that inventive cover composition Ex. 1 and comparative golf ball cover Comp. Ex. 1 exhibit good shear resistance, whereas cover compositions Comp. Ex. 2 and Comp. Ex. 3 do not.

Cores in a golf ball of the invention may be single cores or multi-layered cores. A golf ball of the invention may also display a hardness gradient. In a preferred embodiment, the core hardness gradient as specified herein, measured radially outward from core geometric center to outer surface may be positive, negative or zero (substantially the same hardness). Cores may have a hardness gradient defined by hardness measurements made at the center of the inner core and radially outward towards the outer surface, typically at 2-mm increments. As used herein, the terms "negative" and "positive" refer to the result of subtracting the hardness value at the innermost portion of the component being measured (e.g., the center of a solid core or an inner core in a dual core construction; the inner surface of a core layer; etc.) from the hardness value at the outer surface of the component being measured (e.g., the outer surface of a solid core; the outer surface of an inner core in a dual core; the outer surface of an outer core layer in a dual core, etc.). For example, if the outer surface of a solid core has a lower hardness value than the center (i.e., the surface is softer than the center), the hardness gradient will be deemed a "negative" gradient (a smaller number–a larger number=a negative number).

The core may be made from a composition including at least one thermoset base rubber, such as a polybutadiene rubber, cured with at least one peroxide and at least one reactive co-agent, which can be a metal salt of an unsaturated carboxylic acid, such as acrylic acid or methacrylic acid, a non-metallic coagent, or mixtures thereof. Preferably, a suitable antioxidant is included in the composition. An optional soft and fast agent (and sometimes a cis-to-trans catalyst), such as an organosulfur or metal-containing organosulfur compound, can also be included in the core formulation.

Other ingredients that are known to those skilled in the art may be used, and are understood to include, but not be limited to, density-adjusting fillers, process aides, plasticizers, blowing or foaming agents, sulfur accelerators, and/or non-peroxide radical sources. The base thermoset rubber, which can be blended with other rubbers and polymers, typically includes a natural or synthetic rubber. A preferred base rubber is 1,4-polybutadiene having a cis structure of at least 40%, preferably greater than 80%, and more preferably greater than 90%. Examples of desirable polybutadiene rubbers include BUNA® CB22 and BUNA® CB23, commercially available from LANXESS Corporation; UBEPOL® 360L and UBEPOL® 150L and UBEPOL-BR rubbers, commercially available from UBE Industries, Ltd. of Tokyo, Japan; BUDENE 1208, 1207, commercially available from Goodyear of Akron, Ohio; and CB BUNA® 1203G1, 1220, and 1221, commercially available from Dow Chemical Company; Europrene® NEOCIS® BR 40 and BR 60, commercially available from Polimeri Europa; and BR 01, BR 730, BR 735, BR 11, and BR 51, commercially available from Japan Synthetic Rubber Co., Ltd; and KARBOCHEM® ND40, ND45, and ND60, commercially available from Karbochem.

The base rubber may also comprise high or medium Mooney viscosity rubber, or blends thereof. A "Mooney" unit is a unit used to measure the resistance to flow of raw or unvulcanized rubber. The viscosity in a "Mooney" unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

The Mooney viscosity range is preferably greater than about 40, more preferably in the range from about 40 to about 80 and more preferably in the range from about 40 to about 60. Polybutadiene rubber with higher Mooney viscosity may also be used, so long as the viscosity of the polybutadiene does not reach a level where the high viscosity polybutadiene adversely interferes with the manufacturing machinery. It is contemplated that polybutadiene with viscosity less than 65 Mooney can be used with the present invention.

In one embodiment of the present invention, golf ball cores made with mid- to high-Mooney viscosity polybutadiene material exhibit increased resiliency (and, therefore, distance) without increasing the hardness of the ball. Such cores are soft, i.e., compression less than about 60 and more specifically in the range of about 50-55. Cores with compression in the range of from about 30 about 50 are also within the range of this preferred embodiment.

Commercial sources of suitable mid- to high-Mooney viscosity polybutadiene include LANXESS CB23 (Nd-catalyzed), which has a Mooney viscosity of around 50 and is a highly linear polybutadiene. If desired, the polybutadiene can also be mixed with other elastomers known in the art, such as other polybutadiene rubbers, natural rubber, styrene butadiene rubber, and/or isoprene rubber in order to further modify the properties of the core. When a mixture of elastomers is used, the amounts of other constituents in the core composition are typically based on 100 parts by weight of the total elastomer mixture.

In one preferred embodiment, the base rubber comprises an Nd-catalyzed polybutadiene, a rare earth-catalyzed polybutadiene rubber, or blends thereof. If desired, the polybutadiene can also be mixed with other elastomers known in the art such as natural rubber, polyisoprene rubber and/or styrene-butadiene rubber in order to modify the properties of the core. Other suitable base rubbers include thermosetting materials such as, ethylene propylene diene monomer rubber, ethylene propylene rubber, butyl rubber, halobutyl rubber, hydrogenated nitrile butadiene rubber, nitrile rubber, and silicone rubber.

Thermoplastic elastomers (TPE) may also be used to modify the properties of the core layers, or the uncured core layer stock by blending with the base thermoset rubber. These TPEs include natural or synthetic balata, or high trans-polyisoprene, high trans-polybutadiene, or any styrenic block copolymer, such as styrene ethylene butadiene styrene, styrene-isoprene-styrene, etc., a metallocene or other single-site catalyzed polyolefin such as ethyleneoctene, or ethylene-butene, or thermoplastic polyurethanes (TPU), including copolymers. Other suitable TPEs for blending with the thermoset rubbers of the present invention include PEBAX®, which is believed to comprise polyether amide copolymers, HYTREL@, which is believed to comprise polyether ester copolymers, thermoplastic urethane, and KRATON®, which is believed to comprise styrenic block copolymers elastomers. Any of the TPEs or TPUs above may also contain functionality suitable for grafting, including maleic acid or maleic anhydride.

Additional polymers may also optionally be incorporated into the base rubber. Examples include, but are not limited to, thermoset elastomers such as core regrind, thermoplastic vulcanizate, copolymeric ionomer, terpolymeric ionomer, polycarbonate, polyamide, copolymeric polyamide, polyesters, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, styrene-acrylonitrile polymer (SAN) (including olefin-modified SAN and acrylonitrile-styrene-acrylonitrile polymer), styrene-maleic anhydride copolymer, styrenic copolymer, functionalized styrenic copolymer, functionalized styrenic terpolymer, styrenic terpolymer, cellulose polymer, liquid crystal polymer, ethylene-vinyl acetate copolymers, polyurea, and polysiloxane or any metallocene-catalyzed polymers of these species.

Suitable polyamides for use as an additional polymeric material in compositions within the scope of the present invention also include resins obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, or decamethylenediamine, 1,4-cyclohexanediamine, or m-xylylenediamine; (2) a ring-opening polymerization of cyclic lactam, such as ϵ-caprolactam or Ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine. Specific examples of suitable polyamides include NYLON 6, NYLON 66, NYLON 610, NYLON 11, NYLON 12, copolymerized NYLON, NYLON MXD6, and NYLON 46.

Suitable peroxide initiating agents include dicumyl peroxide; 2,5-dimethyl-2,5-di(t-butylperoxy) hexane; 2,5-dimethyl-2,5-di(t-butylperoxy)hexyne; 2,5-dimethyl-2,5-di(benzoylperoxy)hexane; 2,2'-bis(t-butylperoxy)-di-isopropylbenzene; 1,1-bis(t-butylperoxy)-3,3,5-trimethyl cyclohexane; n-butyl 4,4-bis(t-butyl-peroxy)valerate; t-butyl perbenzoate; benzoyl peroxide; n-butyl 4,4'-bis(butylperoxy) valerate; di-t-butyl peroxide; or 2,5-di-(t-butylperoxy)-2,5-dimethyl hexane, lauryl peroxide, t-butyl hydroperoxide, α-α bis(t-butylperoxy)diisopropylbenzene, di(2-t-butyl-peroxyisopropyl)benzene, di-t-amyl peroxide, di-t-butyl peroxide. Preferably, the rubber composition includes from about 0.25 to about 5.0 parts by weight peroxide per 100 parts by weight rubber (phr), more preferably 0.5 phr to 3 phr, most preferably 0.5 phr to 1.5 phr. In a most preferred embodiment, the peroxide is present in an amount of about 0.8 phr. These ranges of peroxide are given assuming the peroxide is 100% active, without accounting for any carrier that might be present. Because many commercially available peroxides are sold along with a carrier compound, the actual amount of active peroxide present must be calculated. Commercially-available peroxide initiating agents include DICUP™ family of dicumyl peroxides (including DICUP™ R, DICUP™ 40C and DICUP™ 40KE) available from ARKEMA. Similar initiating agents are available from AkroChem, Lanxess, Flexsys/Harwick and R.T. Vanderbilt. Another commercially-available and preferred initiating agent is TRIGONOX™ 265-50B from Akzo Nobel, which is a mixture of 1,1-di(t-butylperoxy)-3,3,5-trimethylcyclohexane and di(2-t-butylperoxyisopropyl)benzene. TRIGONOX™ peroxides are generally sold on a carrier compound.

Suitable reactive co-agents include, but are not limited to, metal salts of diacrylates, dimethacrylates, and monomethacrylates suitable for use in this invention include those wherein the metal is zinc, magnesium, calcium, barium, tin, aluminum, lithium, sodium, potassium, iron, zirconium, and bismuth. Zinc diacrylate (ZDA) is preferred, but the present invention is not limited thereto. ZDA provides golf balls with a high initial velocity. The ZDA can be of various grades of purity. For the purposes of this invention, the lower the quantity of zinc stearate present in the ZDA the higher the ZDA purity. ZDA containing less than about 10% zinc stearate is preferable. More preferable is ZDA containing about 4-8% zinc stearate. Suitable, commercially available zinc diacrylates include those from Cray Valley. The preferred concentrations of ZDA that can be used are about 10 phr to about 40 phr, more preferably 20 phr to about 35 phr, most preferably 25 phr to about 35 phr. In a particularly preferred embodiment, the reactive co-agent is present in an amount of about 29 phr to about 31 phr.

Additional preferred co-agents that may be used alone or in combination with those mentioned above include, but are not limited to, trimethylolpropane trimethacrylate, trimethylolpropane triacrylate, and the like. It is understood by those skilled in the art, that in the case where these co-agents may be liquids at room temperature, it may be advantageous to disperse these compounds on a suitable carrier to promote ease of incorporation in the rubber mixture.

Antioxidants are compounds that inhibit or prevent the oxidative breakdown of elastomers, and/or inhibit or prevent reactions that are promoted by oxygen radicals. Some exemplary antioxidants that may be used in the present invention include, but are not limited to, quinoline type antioxidants, amine type antioxidants, and phenolic type antioxidants. A preferred antioxidant is 2,2'-methylene-bis-(4-methyl-6-t-butylphenol) available as VANOX® MBPC from R.T. Vanderbilt. Other polyphenolic antioxidants include VANOX® T, VANOX® L, VANOX® SKT, VANOX® SWP, VANOX® 13 and VANOX® 1290.

Suitable antioxidants include, but are not limited to, alkylene-bis-alkyl substituted cresols, such as 4,4'-methylene-bis(2,5-xylenol); 4,4'-ethylidene-bis-(6-ethyl-m-cresol); 4,4'-butylidene-bis-(6-t-butyl-m-cresol); 4,4'-decylidene-bis-(6-methyl-m-cresol); 4,4'-methylene-bis-(2-amyl-m-cresol); 4,4'-propylidene-bis-(5-hexyl-m-cresol); 3,3'-decylidene-bis-(5-ethyl-p-cresol); 2,2'-butylidene-bis-(3-n-hexyl-p-cresol); 4,4'-(2-butylidene)-bis-(6-t-butyl-m-cresol); 3,3'-4(decylidene)-bis-(5-ethyl-p-cresol); (2,5-dimethyl-4-hydroxyphenyl) (2-hydroxy-3,5-dimethylphenyl) methane; (2-methyl-4-hydroxy-5-ethylphenyl) (2-ethyl-3-hydroxy-5-methylphenyl) methane; (3-methyl-5-hydroxy-6-t-butylphenyl) (2-hydroxy-4-methyl-5-decylphenyl)-n-butyl methane; (2-hydroxy-4-ethyl-5-methylphenyl) (2-decyl-3-hydroxy-4-methylphenyl)butylamylmethane; (3-ethyl-4-methyl-5-hydroxyphenyl)-(2,3-dimethyl-3-hydroxy-phenyl) nonylmethane; (3-methyl-2-hydroxy-6-ethylphenyl)-(2-isopropyl-3-hydroxy-5-methyl-phenyl)cyclohexylmethane; (2-methyl-4-hydroxy-5-methylphenyl) (2-hydroxy-3-methyl-5-ethylphenyl)dicyclohexyl methane; and the like.

Other suitable antioxidants include, but are not limited to, substituted phenols, such as 2-tert-butyl-4-methoxyphenol; 3-tert-butyl-4-methoxyphenol; 3-tert-octyl-4-methoxyphenol; 2-methyl-4-methoxyphenol; 2-stearyl-4-n-butoxyphenol; 3-t-butyl-4-stearyloxyphenol; 3-lauryl-4-ethoxyphenol; 2,5-di-t-butyl-4-methoxyphenol; 2-methyl-4-methoxyphenol; 2-(1-methycyclohexyl)-4-methoxyphenol; 2-t-butyl-4-dodecyloxyphenol; 2-(1-methylbenzyl)-4-methoxyphenol; 2-t-octyl-4-methoxyphenol; methyl gallate; n-propyl gallate; n-butyl gallate; lauryl gallate; myristyl gallate; stearyl gallate; 2,4,5-trihydroxyacetophenone; 2,4,5-trihydroxy-n-butyrophenone; 2,4,5-trihydroxystearophenone; 2,6-ditert-butyl-4-methylphenol; 2,6-ditert-octyl-4-methylphenol; 2,6-ditert-butyl-4-stearylphenol; 2-methyl-4-methyl-6-tert-butylphenol; 2,6-distearyl-4-methylphenol; 2,6-dilauryl-4-methylphenol; 2,6-di(n-octyl)-4-methylphenol; 2,6-di(n- hexadecyl)-4-methylphenol; 2,6-di(1-methylundecyl)-4-methylphenol; 2,6-di(1-methylheptadecyl)-4-methylphenol; 2,6-di(trimethylhexyl)-4-methylphenol; 2,6-di(1,1,3,3-tetramethyloctyl)-4-methylphenol; 2-n-dodecyl-6-tert butyl-4-methylphenol; 2-n-dodecyl-6-(1-methylundecyl)-4-methylphenol; 2-n-dodecyl-6-(1,1,3,3-tetramethyloctyl)-4-methylphenol; 2-n-dodecyl-6-n-octadecyl-4-methylphenol; 2-n-dodecyl-6-n-octyl-4-methylphenol; 2-methyl-6-n-octadecyl-4-methylphenol; 2-n-dodecyl-6-(1-methylheptadecyl)-4-methylphenol; 2,6-di(1-methylbenzyl)-4-methylphenol; 2,6-di(1-methylcyclohexyl)-4-methylphenol; 2,6-(1-methylcyclohexyl)-4-methylphenol; 2-(1-methylbenzyl)-4-methylphenol; and related substituted phenols.

More suitable antioxidants include, but are not limited to, alkylene bisphenols, such as 4,4'-butylidene bis(3-methyl-6-t-butyl phenol); 2,2-butylidene bis(4,6-dimethyl phenol); 2,2'-butylidene bis(4-methyl-6-t-butyl phenol); 2,2'-butylidene bis(4-t-butyl-6-methyl phenol); 2,2'-ethylidene bis(4-methyl-6-t-butylphenol); 2,2'-methylene bis(4,6-dimethyl phenol); 2,2'-methylene bis(4-methyl-6-t-butyl phenol); 2,2'-methylene bis(4-ethyl-6-t-butyl phenol); 4,4'-methylene bis(2,6-di-t-butyl phenol); 4,4'-methylene bis(2-methyl-6-t-butyl phenol); 4,4'-methylene bis(2,6-dimethyl phenol); 2,2'-methylene bis(4-t-butyl-6-phenyl phenol); 2,2'-dihydroxy-3,3',5,5'-tetramethylstilbene; 2,2'-isopropylidene bis (4-methyl-6-t-butyl phenol); ethylene bis(beta-naphthol); 1,5-dihydroxy naphthalene; 2,2'-ethylene bis(4-methyl-6-propyl phenol); 4,4'-methylene bis(2-propyl-6-t-butyl phenol); 4,4'-ethylene bis(2-methyl-6-propyl phenol); 2,2'-methylene bis(5-methyl-6-t-butyl phenol); and 4,4'-butylidene bis(6-t-butyl-3-methyl phenol);

Suitable antioxidants further include, but are not limited to, alkylene trisphenols, such as 2,6-bis(2'-hydroxy-3'-t-butyl-5'-methyl benzyl)-4-methyl phenol; 2,6-bis(2'-hydroxy-3'-t-ethyl-5'-butyl benzyl)-4-methyl phenol; and 2,6-bis(2'-hydroxy-3'-t-butyl-5'-propyl benzyl)-4-methyl phenol.

The antioxidant is typically present in an amount of about 0.1 phr to about 5 phr, preferably from about 0.1 phr to about 2 phr, more preferably about 0.1 phr to about 1 phr. In a particularly preferred embodiment, the antioxidant is present in an amount of about 0.4 phr. In an alternative embodiment, the antioxidant should be present in an amount to ensure that the hardness gradient of the inventive cores is negative. Preferably, about 0.2 phr to about 1 phr antioxidant is added to the core layer (inner core or outer core layer) formulation, more preferably, about 0.3 to about 0.8 phr, and most preferably 0.4 to about 0.7 phr. Preferably, about 0.25 phr to about 1.5 phr of peroxide as calculated at 100% active can be added to the core formulation, more preferably about 0.5 phr to about 1.2 phr, and most preferably about 0.7 phr to about 1.0 phr. The ZDA amount can be varied to suit the desired compression, spin and feel of the resulting golf ball. The cure regime can have a temperature range between from about 290° F. to about 360° F., or from about 290° F. to about 335° F., or from about 300° F. to about 325° F., or from about 330° F. to about 355° F., and the stock is held at that temperature for at least about 10 minutes to about 30 minutes.

The thermoset rubber composition in a core of the golf ball of the present invention may also include an optional soft and fast agent. As used herein, "soft and fast agent" means any compound or a blend thereof that that is capable of making a core 1) be softer (lower compression) at constant COR or 2) have a higher COR at equal compression, or any combination thereof, when compared to a core equivalently prepared without a soft and fast agent. Preferably, the composition of the present invention contains from about 0.05 phr to about 10.0 phr soft and fast agent. In one embodiment, the soft and fast agent is present in an amount of about 0.05 phr to about 3.0 phr, preferably about 0.05 phr to about 2.0 phr, more preferably about 0.05 phr to about 1.0 phr. In another embodiment, the soft and fast agent is present in an amount of about 2.0 phr to about 5.0 phr, preferably about 2.35 phr to about 4.0 phr, and more preferably about 2.35 phr to about 3.0 phr. In an alternative high concentration embodiment, the soft and fast agent is present in an amount of about 5.0 phr to about 10.0 phr, more preferably about 6.0 phr to about 9.0 phr, most preferably about 7.0 phr to about 8.0 phr. In a most preferred embodiment, the soft and fast agent is present in an amount of about 2.6 phr.

Suitable soft and fast agents include, but are not limited to, organosulfur or metal-containing organosulfur compounds, an organic sulfur compound, including mono, di, and polysulfides, a thiol, or mercapto compound, an inorganic sulfide compound, a Group VIA compound, or mixtures thereof. The soft and fast agent component may also be a blend of an organosulfur compound and an inorganic sulfide compound.

Suitable soft and fast agents of the present invention include, but are not limited to those having the following general formula:

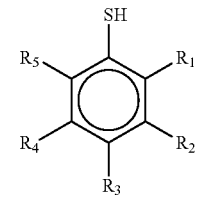

where $R_1$-$R_5$ can be $C_1$-$C_8$ alkyl groups; halogen groups; thiol groups (—SH), carboxylated groups; sulfonated groups; and hydrogen; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenol and; and their zinc salts. Preferably, the halogenated thiophenol compound is pentachlorothiophenol, which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, OH. PCTP is commercially available in neat form from eChinachem of San Francisco, Calif. and in the salt form from eChinachem of San Francisco, Calif. Most preferably, the halogenated thiophenol compound is the zinc salt of pentachlorothiophenol, which is commercially available from eChinachem of San Francisco, Calif.

As used herein when referring to the invention, the term "organosulfur compound(s)" refers to any compound containing carbon, hydrogen, and sulfur, where the sulfur is directly bonded to at least 1 carbon. As used herein, the term "sulfur compound" means a compound that is elemental sulfur, polymeric sulfur, or a combination thereof. It should be further understood that the term "elemental sulfur" refers to the ring structure of Ss and that "polymeric sulfur" is a structure including at least one additional sulfur relative to elemental sulfur.

Additional suitable examples of soft and fast agents (that are also believed to be cis-to-trans catalysts) include, but are not limited to, 4,4'-diphenyl disulfide; 4,4'-ditolyl disulfide; 2,2'-benzamido diphenyl disulfide; bis(2-aminophenyl)disulfide; bis(4-aminophenyl)disulfide; bis(3-aminophenyl)disulfide; 2,2'-bis(4-aminonaphthyl)disulfide; 2,2'-bis(3-aminonaphthyl)disulfide; 2,2'-bis(4-aminonaphthyl)disulfide; 2,2'-bis(5-aminonaphthyl)disulfide; 2,2'-bis(6-aminonaphthyl)disulfide; 2,2'-bis(7-aminonaphthyl)disulfide; 2,2'-bis(8-aminonaphthyl)disulfide; 1,1'-bis(2-aminonaphthyl)disulfide; 1,1'-bis(3-aminonaphthyl)disulfide; 1,1'-bis(3-aminonaphthyl)disulfide; 1,1'-bis(4-aminonaphthyl) disulfide; 1,1'-bis(5-aminonaphthyl)disulfide; 1,1'-bis(6-aminonaphthyl)disulfide; 1,1'-bis(7-aminonaphthyl) disulfide; 1,1'-bis(8-aminonaphthyl)disulfide; 1,2'-diamino-1,2'-dithiodinaphthalene; 2,3'-diamino-1,2'-dithiodinaphthalene; bis(4-chlorophenyl)disulfide; bis(2-chlorophenyl)disulfide; bis(3-chlorophenyl)disulfide; bis(4-bromophenyl)disulfide; bis(2-bromophenyl)disulfide; bis(3-bromophenyl)disulfide; bis(4-fluorophenyl)disulfide; bis(4-iodophenyl)disulfide; bis(2,5-dichlorophenyl)disulfide; bis(3,5-dichlorophenyl)disulfide; bis(2,4-dichlorophenyl)disulfide; bis(2,6-dichlorophenyl)disulfide; bis(2,5-dibromophenyl)disulfide; bis(3,5-dibromophenyl)disulfide; bis(2-chloro-5-bromophenyl)disulfide; bis(2,4,6-trichlorophenyl)disulfide; bis(2,3,4,5,6-pentachlorophenyl)disulfide; bis(4-cyanophenyl)disulfide; bis(2-cyanophenyl)disulfide; bis(4-nitrophenyl)disulfide; bis(2-nitrophenyl)disulfide; 2,2'-dithiobenzoic acid ethylester; 2,2'-dithiobenzoic acid methylester; 2,2'-dithiobenzoic acid; 4,4'-dithiobenzoic acid ethylester; bis(4-acetylphenyl)disulfide; bis(2-acetylphenyl) disulfide; bis(4-formylphenyl)disulfide; bis(4-carbamoylphenyl)disulfide; 1,1'-dinaphthyl disulfide; 2,2'-dinaphthyl disulfide; 1,2'-dinaphthyl disulfide; 2,2'-bis(1-chlorodinaphthyl)disulfide; 2,2'-bis(1-bromonaphthyl)disulfide; 1,1'-bis(2-chloronaphthyl)disulfide; 2,2'-bis(1-cyanonaphthyl)disulfide; 2,2'-bis(1-acetylnaphthyl)disulfide; and the like; or a mixture thereof. Preferred organosulfur components include 4,4'-diphenyl disulfide, 4,4'-ditolyl disulfide, or 2,2'-benzamido diphenyl disulfide, or a mixture thereof. A more preferred organosulfur component includes 4,4'-ditolyl disulfide. In another embodiment, metal-containing organosulfur components can be used according to the invention. Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof.

Suitable substituted or unsubstituted aromatic organic components that do not include sulfur or a metal include, but are not limited to, 4,4'-diphenyl acetylene, azobenzene, or a mixture thereof. The aromatic organic group preferably ranges in size from $C_6$ to $C_{20}$, and more preferably from $C_6$ to $C_{10}$. Suitable inorganic sulfide components include, but are not limited to titanium sulfide, manganese sulfide, and sulfide analogs of iron, calcium, cobalt, molybdenum, tungsten, copper, selenium, yttrium, zinc, tin, and bismuth.

A substituted or unsubstituted aromatic organic compound is also suitable as a soft and fast agent. Suitable substituted or unsubstituted aromatic organic components include, but are not limited to, components having the formula $(R_1)_x$—$R_3$-M-$R_4$—$(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_6$ to $C_{24}$ aromatic group; x and y are each an integer from 0 to 5; $R_3$ and $R_4$ are each selected from a single, multiple, or fused ring $C_6$ to $C_{24}$ aromatic group; and M includes an azo group or a metal component. $R_3$ and $R_4$ are each preferably selected from a $C_6$ to $C_{10}$ aromatic group, more preferably selected from phenyl, benzyl, naphthyl, benzamido, and benzothiazyl. $R_1$ and $R_2$ are each preferably selected from a substituted or unsubstituted $C_{1-10}$ linear, branched, or cyclic alkyl, alkoxy, or alkylthio group or a $C_6$ to $C_{10}$ aromatic group. When $R_1$, $R_2$, $R_3$, or $R_4$, are substituted, the substitution may include one or more of the following substituent groups: hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites. When M is a metal component, it may be any suitable elemental metal available to those of ordinary skill in the art. Typically, the metal will be a transition metal, although preferably it is tellurium or selenium. In one embodiment, the aromatic organic compound is substantially free of metal, while in another embodiment the aromatic organic compound is completely free of metal.

The soft and fast agent can also include a Group VIA component. Elemental sulfur and polymeric sulfur are commercially available from Elastochem, Inc. of Chardon, Ohio Exemplary sulfur catalyst compounds include PB(RM-S)-80 elemental sulfur and PB(CRST)-65 polymeric sulfur, each of which is available from Elastochem, Inc. An exemplary tellurium catalyst under the tradename TELLOY® and an exemplary selenium catalyst under the tradename VANDEX® are each commercially available from RT Vanderbilt.

Fillers may also be added to the thermoset rubber composition of the core to adjust the density of the composition, up or down. Typically, fillers include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, trans-regrind core material (recycled core material containing high trans-isomer of polybutadiene), and the like. When trans-regrind is present, the amount of trans-isomer is preferably between about 10% and about 60%. In a preferred embodiment of the invention, the core comprises polybutadiene having a cis-isomer content of greater than about 95% and trans-regrind core material (already vulcanized) as a filler. Any particle size trans-regrind core material is sufficient, but is preferably less than about 125 µm.

Fillers added to one or more portions of the golf ball typically include processing aids or compounds to affect rheological and mixing properties, density-modifying fillers, tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

Materials such as tungsten, zinc oxide, barium sulfate, silica, calcium carbonate, zinc carbonate, metals, metal oxides and salts, and regrind (recycled core material typically ground to about 30 mesh particle) are also suitable fillers.

The polybutadiene and/or any other base rubber or elastomer system may also be foamed, or filled with hollow microspheres or with expandable microspheres which expand at a set temperature during the curing process to any low specific gravity level. Other ingredients such as sulfur accelerators, e.g., tetramethylthiuram di, tri, or tetrasulfide, and/or metal-containing organosulfur components may also be used according to the invention. Suitable metal-containing organosulfur accelerators include, but are not limited to, cadmium, copper, lead, and tellurium analogs of diethyldithiocarbamate, diamyldithiocarbamate, and dimethyldithiocarbamate, or mixtures thereof. Other ingredients such as processing aids e.g., fatty acids and/or their metal salts, processing oils, dyes and pigments, as well as other additives known to one skilled in the art may also be used in the present invention in amounts sufficient to achieve the purpose for which they are typically used.

Without being bound by theory, it is believed that the percentage of double bonds in the trans configuration may be manipulated throughout a core containing at least one main-chain unsaturated rubber (i.e., polybutadiene), plastic, or elastomer resulting in a trans gradient. The trans gradient may be influenced (up or down) by changing the type and amount of cis-to-trans catalyst (or soft-and-fast agent), the type and amount of peroxide, and the type and amount of coagent in the formulation. For example, a formulation containing about 0.25 phr ZnPCTP may have a trans gradient of about 5% across the core whereas a formulation containing about 2 phr ZnPCTP may have a trans gradient of about 10%, or higher. The trans gradient may also be manipulated through the cure times and temperatures. It is believed that lower temperatures and shorter cure times yield lower trans gradients, although a combination of many of these factors may yield gradients of differing and/or opposite directions from that resulting from use of a single factor.

In general, higher and/or faster cure rates tend to yield higher levels of trans content, as do higher concentrations of peroxides, soft-and-fast agents, and, to some extent, ZDA concentration. Even the type of rubber may have an effect on trans levels, with those catalyzed by rare-earth metals, such as Nd, being able to form higher levels of trans polybutadiene compared to those rubbers formed from Group VIII metals, such as Co, Ni, and Li.

Cores may have an outer surface and a center and be formed from a substantially homogenous rubber composition. An intermediate layer, such as a casing layer (inner cover), is disposed about the core, and a cover layer is formed around the intermediate layer, the cover being formed from the materials detailed herein. In some embodiments, a hardness of the outer surface of the core differs from a hardness of the geometric center as defined herein. In other embodiments, the hardness of the outer surface and hardness of the geometric center do not differ.

Additionally, a core may have a 'dual core' arrangement, including a center and at least one outer core layer.

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within ±0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The hardness of a core may be measured by taking measurements at the center of the core and radially outward toward the surface of the core, typically at 2-mm increments. As used herein, the terms "negative" and "positive" refer to the result of subtracting the hardness value at the innermost portion of the component being measured (e.g., the center of a core) from the hardness value at the outer surface of the component being measured (e.g., the outer surface of the single core or the outer surface of an outer core layer in a dual core arrangement, etc.).

The center hardness of a core and the outer surfaces of a single core or outer core layer in a multi-layer core arrangement are readily determined according to the procedures given herein if the measurement is made prior to surrounding the layer with an additional core layer.

Once an additional core layer surrounds a layer of interest, the hardness of the inner and outer surfaces of any inner or intermediate layers can be difficult to determine so that a different procedure detailed below may be used for measuring a point located 1 mm from an interface is used. The hardness of a golf ball layer at a point located 1 mm from an interface is obtained according to the following procedure. First, an axis defining the geometric center of the core is revealed by preparing the core according to the above procedure for measuring the center hardness of a core. Leaving the core in the holder, a point located 1 mm radially inward or outward from the interface of two layers is determined and marked, and the hardness thereof is measured according to ASTM D-2240.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to insure that the golf ball or golf ball subassembly is centered under the durometer indentor before a surface hardness reading is obtained. A calibrated, digital durometer, capable of reading to 0.1 hardness units is used for all hardness measurements and the maximum reading is obtained. The digital durometer must be attached to, and its foot made parallel to, the base of an automatic stand. The weight on the durometer and attack rate conform to ASTM D-2240.

The ratio of antioxidant to initiator is one factor to control the surface hardness of the cores.

In all preferred embodiments of invention, the hardness of the core at the surface is at most about the same as or different than the hardness of the core at the center as defined herein. Furthermore, the center hardness of the core may not be the hardest point in the core, but in all cases, it is preferred that it is at least equal to or harder than the surface. Additionally, the lowest hardness anywhere in the core does not have to occur at the surface. In some embodiments, the lowest hardness value occurs within about the outer 6 mm of the core surface. However, the lowest hardness value within the core can occur at any point from the surface, up to, but not including the center, as long as the surface hardness is still equal to, or less than the hardness of the center. It should be noted that in the present invention the formulation is the same throughout the core, or core layer, and no surface treatment is applied to the core to obtain the preferred surface hardness.

The casing layer may be made from a variety of materials. In one embodiment, the casing layer is formed from an ionomeric material including ionomeric polymers, preferably highly-neutralized ionomers (HNP). In another embodiment, the casing layer of the golf ball is formed from an HNP material or a blend of HNP materials. The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may also be neutralized. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

In one embodiment of the present invention the HNP's are ionomers and/or their acid precursors that are preferably neutralized, either fully or partially, with a suitable base. The acid copolymers are preferably α-olefin, such as ethylene, $C_{3-8}$ α,β-ethylenically unsaturated carboxylic acid, such as acrylic and methacrylic acid, copolymers. They may optionally contain a softening monomer, such as alkyl acrylate and alkyl methacrylate, wherein the alkyl groups have from 1 to 8 carbon atoms.

The acid copolymers can be described as E/X/Y copolymers where E is ethylene, X is an α,β-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

Specific acid-containing ethylene copolymers include, but are not limited to, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include, ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate copolymers. The most preferred acid-containing ethylene copolymers are, ethylene/(meth) acrylic acid/n-butyl, acrylate, ethylene/(meth)acrylic acid/ethyl acrylate, and ethylene/(meth) acrylic acid/methyl acrylate copolymers.

Ionomers are typically neutralized with a metal cation, such as Li, Na, Mg, K, Ca, or Zn. It has been found that by adding sufficient organic acid or salt of organic acid, along with a suitable base, to the acid copolymer or ionomer, however, the ionomer can be neutralized, without losing processability, to a level much greater than for a metal cation. Preferably, the acid moieties are neutralized greater than about 80%, preferably from 90-100%, most preferably 100% without losing processability. This accomplished by melt-blending an ethylene α,β-ethylenically unsaturated carboxylic acid copolymer, for example, with an organic acid or a salt of organic acid, and adding a sufficient amount of a cation source to increase the level of neutralization of all the acid moieties (including those in the acid copolymer and in the organic acid) to greater than 90%, (preferably greater than 100%).

The organic acids of the present invention are aliphatic, mono- or multi-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

The ionomers of the invention may also be more conventional ionomers, i.e., partially-neutralized with metal cations. The acid moiety in the acid copolymer is neutralized about 1 to about 90%, preferably at least about 20 to about 75%, and more preferably at least about 40 to about 70%, to form an ionomer, by a cation such as lithium, sodium, potassium, magnesium, calcium, barium, lead, tin, zinc, aluminum, or a mixture thereof.

Any golf ball component, namely core, casing layer, cover, etc. may also be formed from or comprise or include or be blended or otherwise combined or mixed with any of the following compositions as known in the art. Additionally, such materials may also or alternatively be mixed, blended or otherwise combined with the inventive cover composition to achieve particular desired golf ball characteristics:

(1) Polyurethanes, such as those prepared from polyols and diisocyanates or polyisocyanates and/or their prepolymers, and those disclosed in U.S. Pat. Nos. 5,334,673 and 6,506,851;
(2) Polyureas, such as those disclosed in U.S. Pat. Nos. 5,484,870 and 6,835,794; and
(3) Polyurethane-urea hybrids, blends or copolymers comprising urethane or urea segments.

Suitable polyurethane compositions comprise a reaction product of at least one polyisocyanate and at least one curing agent. The curing agent can include, for example, one or more polyols. The polyisocyanate can be combined with one or more polyols to form a prepolymer, which is then combined with the at least one curing agent. Thus, the polyols described herein are suitable for use in one or both components of the polyurethane material, i.e., as part of a prepolymer and in the curing agent. Suitable polyurethanes are described in U.S. Pat. No. 7,331,878, which is incorporated herein in its entirety by reference.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate)glycol; and mixtures thereof. The hydrocarbon chain can have saturated or unsaturated bonds, or substituted or unsubstituted aromatic and cyclic groups. In another embodiment, polycaprolactone polyols are included in the materials of the invention. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000. Polyamine curatives are also suitable for use in the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline; m-phenylenediamine; 4,4'-methylene-bis-(2-chloroaniline); 4,4'-methylene-bis-(2,6-diethylaniline); 4,4'-methylene-bis-(2,3-dichloroaniline); 4,4'-diamino-3,3'-diethyl-5,5'-dimethyl diphenylmethane; 2,2',3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE® 300, commercially available from Albermarle Corporation of Baton Rouge, La. Suitable polyamine curatives, which include both primary and secondary amines, preferably have molecular weights ranging from about 64 to about 2000.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxyl)ethoxy]benzene; 1,3-bis-{2-[2-(2-hydroxyethoxyl)ethoxy]ethoxy}benzene; 1,4-butanediol; 1,5-pentanediol; 1,6-hexanediol; resorcinol-di-(β-hydroxyethyl) ether; hydroquinone-di-(β-hydroxyethyl) ether; and mixtures thereof. Preferred hydroxy-terminated curatives include 1,3-bis(2-hydroxyethoxy)benzene; 1,3-bis-[2-(2-hydroxyethoxyl)ethoxy]benzene; 1,3-bis-{2-[2-(2-hydroxyethoxyl)ethoxy]ethoxy}benzene; 1,4-butanediol, and mixtures thereof. Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane-urea composition may be formed with a single curing agent.

In a preferred embodiment of the present invention, saturated polyurethanes are used to form one or more of the cover layers, preferably the outer cover layer, and may be selected from among both castable thermoset and thermoplastic polyurethanes.

In this embodiment, the saturated polyurethanes of the present invention are substantially free of aromatic groups or moieties. Saturated polyurethanes suitable for use in the invention are a product of a reaction between at least one polyurethane prepolymer and at least one saturated curing agent. The polyurethane prepolymer is a product formed by a reaction between at least one saturated polyol and at least one saturated diisocyanate. As is well known in the art, that a catalyst may be employed to promote the reaction between the curing agent and the isocyanate and polyol, or the curing agent and the prepolymer.

Saturated diisocyanates which can be used include, without limitation, ethylene diisocyanate; propylene-1,2-diisocyanate; tetramethylene-1,4-diisocyanate; 1,6-hexamethylene-diisocyanate (HDI); 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate; methyl cyclohexylene diisocyanate; triisocyanate of HDI; triisocyanate of 2,2,4-trimethyl-1,6-hexane diisocyanate.

Saturated polyols which are appropriate for use in this invention include without limitation polyether polyols such as polytetramethylene ether glycol and poly(oxypropylene) glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol-initiated polycaprolactone, 1,4-butanediol-initiated polycaprolactone, 1,6-hexanediol-initiated polycaprolactone; trimethylol propane-initiated polycaprolactone, neopentyl glycol initiated polycaprolactone, and polytetramethylene ether glycol-initiated polycaprolactone. The most preferred saturated polyols are polytetramethylene ether glycol and PTMEG-initiated polycaprolactone.

Suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine; ethylene diamine; diethylene triamine; triethylene tetramine; tetraethylene pentamine; 4,4'-dicyclohexylmethane diamine; 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino) cyclohexane; 1,4-bis-(sec-butylamino)cyclohexane; isophorone diamine; hexamethylene diamine; propylene diamine; 1-methyl-2,4-cyclohexyl diamine; 1-methyl-2,6-cyclohexyl diamine; 1,3-diaminopropane; dimethylamino propylamine; diethylamino propylamine; imido-bis-propylamine; isomers and mixtures of isomers of diaminocyclohexane; monoethanolamine; diethanolamine; triethanolamine; monoisopropanolamine; and diisopropanolamine. The most preferred saturated curatives are 1,4-butanediol, 1,4-cyclohexyldimethylol and 4,4'-bis-(sec-butylamino)-dicyclohexylmethane.

Alternatively, other suitable polymers include partially or fully neutralized ionomer, metallocene, or other single-site catalyzed polymer, polyester, polyamide, non-ionomeric thermoplastic elastomer, copolyether-esters, copolyether-amides, polycarbonate, polybutadiene, polyisoprene, polystryrene block copolymers (such as styrene-butadiene-styrene), styrene-ethylene-propylene-styrene, styrene-ethylene-butylene-styrene, and the like, and blends thereof. Thermosetting polyurethanes or polyureas are suitable for the outer cover layers of the golf balls of the present invention.

Additionally, the polyurethane can be replaced with or blended with a polyurea material. Polyureas are distinctly different from polyurethane compositions, but also result in desirable aerodynamic and aesthetic characteristics when used in golf ball components. The polyurea-based compositions are preferably saturated in nature.

Without being bound to any particular theory, it is now believed that substitution of the long chain polyol segment in the polyurethane prepolymer with a long chain polyamine oligomer soft segment to form a polyurea prepolymer, improves shear, cut, and resiliency, as well as adhesion to other components. Thus, the polyurea compositions of this invention may be formed from the reaction product of an isocyanate and polyamine prepolymer crosslinked with a curing agent. For example, polyurea-based compositions of the invention may be prepared from at least one isocyanate, at least one polyether amine.

Any polyamine available to one of ordinary skill in the art is suitable for use in the polyurea prepolymer. Polyether amines are particularly suitable for use in the prepolymer. As used herein, "polyether amines" refer to at least polyoxyalkyleneamines containing primary amino groups attached to the terminus of a polyether backbone. Due to the rapid reaction of isocyanate and amine, and the insolubility of many urea products, however, the selection of diamines and polyether amines is limited to those allowing the successful formation of the polyurea prepolymers. In one embodiment, the polyether backbone is based on tetramethylene, propylene, ethylene, trimethylolpropane, glycerin, and mixtures thereof.

Suitable polyether amines include, but are not limited to, methyldiethanolamine; polyoxyalkylenediamines such as, polytetramethylene ether diamines, polyoxypropylenetriamine, and polyoxypropylene diamines; poly(ethylene oxide capped oxypropylene) ether diamines; propylene oxide-based triamines; triethyleneglycoldiamines; trimethylolpropane-based triamines; glycerin-based triamines; and mixtures thereof. In one embodiment, the polyether amine used to form the prepolymer is JEFFAMINE® D2000 (manufactured by Huntsman Chemical Co. of Austin, Tex.).

The molecular weight of the polyether amine for use in the polyurea prepolymer may range from about 100 to about 5000. In one embodiment, the polyether amine molecular weight is about 200 or greater, preferably about 230 or greater. In another embodiment, the molecular weight of the polyether amine is about 4000 or less. In yet another embodiment, the molecular weight of the polyether amine is about 600 or greater. In still another embodiment, the molecular weight of the polyether amine is about 3000 or less. In yet another embodiment, the molecular weight of the polyether amine is between about 1000 and about 3000, and more preferably is between about 1500 to about 2500. Because lower molecular weight polyether amines may be prone to forming solid polyureas, a higher molecular weight oligomer, such as JEFFAMINE® D2000, is preferred.

As briefly discussed above, some amines may be unsuitable for reaction with the isocyanate because of the rapid reaction between the two components. In particular, shorter chain amines are fast reacting. In one embodiment, however, a hindered secondary diamine may be suitable for use in the prepolymer. Without being bound to any particular theory, it is believed that an amine with a high level of stearic hindrance, e.g., a tertiary butyl group on the nitrogen atom, has a slower reaction rate than an amine with no hindrance or a low level of hindrance. For example, 4,4'-bis-(sec-butylamino)-dicyclohexylmethane (CLEARLINK® 1000) may be suitable for use in combination with an isocyanate to form the polyurea prepolymer.

The number of unreacted NCO groups in the polyurea prepolymer may be varied to control such factors as the speed of the reaction, the resultant hardness of the composition, and the like. For instance, the number of unreacted NCO groups in the polyurea prepolymer and polyether amine may be less than about 14 percent. In one embodiment, the polyurea prepolymer has from about 5 percent to about 11 percent unreacted NCO groups, and even more preferably has from about 6 to about 9.5 percent unreacted NCO groups. In one embodiment, the percentage of unreacted NCO groups is about 3 percent to about 9 percent. Alternatively, the percentage of unreacted NCO groups in the polyurea prepolymer may be about 7.5 percent or less, and more preferably, about 7 percent or less. In another embodiment, the unreacted NCO content is from about 2.5 percent to about 7.5 percent, and more preferably from about 4 percent to about 6.5 percent.

When formed, polyurea prepolymers may contain about 10 percent to about 20 percent by weight of the prepolymer of free isocyanate monomer. Thus, in one embodiment, the polyurea prepolymer may be stripped of the free isocyanate monomer. For example, after stripping, the prepolymer may contain about 1 percent or less free isocyanate monomer. In another embodiment, the prepolymer contains about 0.5 percent by weight or less of free isocyanate monomer.

The polyether amine may be blended with additional polyols to formulate copolymers that are reacted with excess isocyanate to form the polyurethane/polyurea hybrid. In one embodiment, less than about 30 percent polyol by weight of the copolymer is blended with the saturated polyether amine. In another embodiment, less than about 20 percent polyol by weight of the copolymer, preferably less than about 15 percent by weight of the copolymer, is blended with the polyether amine. The polyols listed above with respect to the polyurethane prepolymer, e.g., polyether polyols, polycaprolactone polyols, polyester polyols, polycarbonate polyols, hydrocarbon polyols, other polyols, and mixtures thereof, are also suitable for blending with the polyether amine. The molecular weight of these polymers may be from about 200 to about 4000, but also may be from about 1000 to about 3000, and more preferably are from about 1500 to about 2500.

The polyurea composition can be formed by crosslinking the polyurea prepolymer with a single curing agent or a blend of curing agents. The curing agent of the invention is preferably an amine-terminated curing agent, more preferably a secondary diamine curing agent so that the composition contains only urea linkages. In one embodiment, the amine-terminated curing agent may have a molecular weight of about 64 or greater. In another embodiment, the molecular weight of the amine-curing agent is about 2000 or less. As discussed above, certain amine-terminated curing agents may be modified with a compatible amine-terminated freezing point depressing agent or mixture of compatible freezing point depressing agents.

Suitable amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol di-(aminopropyl) ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; dipropylene triamine; imido-bis-propylamine; monoethanolamine, diethanolamine; triethanolamine; monoisopropanolamine, diisopropanolamine; isophoronediamine; 4,4'-methylenebis-(2-chloroaniline); 3,5; dimethylthio-2,4-toluenediamine; 3,5-dimethylthio-2,6-toluenediamine; 3,5-diethylthio-2,4-toluenediamine; 3,5; diethylthio-2,6-toluenediamine; 4,4'-bis-(sec-butylamino)-diphenylmethane and derivatives thereof; 1,4-bis-(sec-butylamino)-benzene; 1,2-bis-(sec-butylamino)-benzene; N,N'-dialkylamino-diphenylmethane; N,N,N',N'-tetrakis(2-hydroxypropyl)ethylene diamine; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; and mixtures thereof. In one embodiment, the amine-terminated curing agent is 4,4'-bis-(sec-butylamino)-dicyclohexylmethane.

Suitable saturated amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 4,4'-methylenebis-(2,6-diethylaminocyclohexane; 1,4-cyclohexane-bis-(methylamine); 1,3-cyclohexane-bis-(methylamine); diethylene glycol di-(aminopropyl) ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-bis-propylamine; monoethanolamine, diethanolamine; triethanolamine; monoisopropanolamine, diisopropanolamine; isophoronediamine; triisopropanolamine; and mixtures thereof. In addition, any of the polyether amines listed above may be used as curing agents to react with the polyurea prepolymers.

In a golf ball of the invention, the cover preferably comprises an opaque or translucent thermoset or thermoplastic aliphatic isocyanate-based material.

The flexural modulus of the cover material of a golf ball of the invention may be evaluated according to ASTM D-790.

Compression values are dependent on the diameter of the component being measured. In the present invention, a solid 1.55' sphere of inventive material may have a DCM compression anywhere from −75 to about 200, depending on the desired properties of the resulting golf ball, although numerous preferred ranges are as disclosed and coordinated herein. The Dynamic Compression Machine ("DCM") is an apparatus that applies a load to a core or ball and measures the number of inches the core or ball is deflected at measured loads. A crude load/deflection curve is generated that is fit to the Atti compression scale that results in a number being generated representing an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test. DCM is often used to capture compressions that fall outside the Atti compression scale range of −75 to 200, since the DCM scale compression range is −246 to 200.

COR, as used herein, is determined by firing a golf ball or golf ball subassembly (e.g., a golf ball core) from an air cannon at two given velocities and calculating the COR at a velocity of 125 ft/s. Ball velocity is calculated as a ball approaches ballistic light screens which are located between the air cannon and a steel plate at a fixed distance. As the ball travels toward the steel plate, each light screen is activated, and the time at each light screen is measured. This provides an incoming transit time period inversely proportional to the ball's incoming velocity. The ball impacts the steel plate and rebounds though the light screens, which again measure the time period required to transit between the light screens. This provides an outgoing transit time period inversely proportional to the ball's outgoing velocity. COR is then calculated as the ratio of the outgoing transit time period to the incoming transit time period, $COR=V_{out}/V_{in}=T_{in}/T_{out}$. The COR value can be targeted by varying the peroxide and antioxidant types and amounts as well as the cure temperature and duration. The COR value can be targeted by varying the peroxide and antioxidant types and amounts as well as the cure temperature and duration.

The cover of the golf ball of the present invention may comprise any known color and optionally comprise surface off-sets, or depressions or projections, on its surface. Surface off-sets include dimples and marking other than dimples. For instance, the surface of the translucent cover may comprise depressed logos, text, lines, arcs, circles or polygons. The surface may also comprise raised projections in the form of logos, text, lines, arcs, circles or polygons. The inclusion of such surface off-sets on the translucent cover creates a unique visual effect, as the juxtaposition of thick and thin portions of the translucent cover material creates a "shadow" effect on the opaque surface below the translucent cover.

While any of the embodiments herein may have any known dimple number and pattern, a preferred number of dimples is 252 to 456, and more preferably is 330 to 392. The dimples may comprise any width, depth, and edge angle disclosed in the prior art and the patterns may comprises multitudes of dimples having different widths, depths and edge angles. The parting line configuration of said pattern may be either a straight line or a staggered wave parting line (SWPL). Most preferably the dimple number is 330, 332, or 392 and comprises 5 to 7 dimples sizes and the parting line is a SWPL.

In any of these embodiments the single-layer core may be replaced with a 2 or more layer core wherein at least one core layer has a hardness gradient.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

While it is apparent that the illustrative embodiments of the invention disclosed herein fulfill the objective stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. A golf ball comprising:
   a core;
   a casing layer surrounding the core; and
   a cover layer surrounding the casing layer and being formed from cover composition PC that is produced by a reaction of a prepolymer and a chain extender, wherein the prepolymer is formed from the reaction product of: (i) an isocyanate comprising an allophanate ("ICA") and having an average NCO functionality in the range of 1.9 to 2.8 and (ii) a polyol-containing component; and
   wherein the chain-extender is selected from the group consisting of amine-terminated chain-extenders, hydroxyl-terminated chain-extenders, and mixtures thereof; and wherein the ICA is reacted with the polyol-containing component and chain-extender in a weight ratio of about 1.9:1; and
   wherein the polyol-containing component and chain-extender are included in cover composition PC in a weight ratio of about 1.3:1.

2. The golf ball of claim 1, wherein the isocyanate comprises a reaction product of hexamethylene diisocyanate (HDI), at least one monoalcohol, and a bismuth-containing catalyst.

3. The golf ball of claim 2, wherein the monoalcohol is selected from the group consisting of: ethoxylated $C_{12}$-$C_{14}$ alcohols, ethoxylated $C_{16}$-$C_{18}$ alcohols, and ethoxylated $C_{10}$-$C_{16}$ alcohols.

4. The golf ball of claim 1, wherein the core has a surface hardness H of from about 50 Shore C to about 90 Shore C and a center hardness CH of from about 50 Shore C to about 90 Shore C, the casing layer has a surface hardness A of from about 45 Shore D to about 80 Shore D, and the cover has a hardness B of from about 65 Shore C to about 90 Shore C.

5. The golf ball of claim 4, wherein H is greater than CH.

6. The golf ball of claim 4, wherein H is less than CH.

7. The golf ball of claim 4, wherein H is substantially similar to CH.

8. The golf ball of claim 1, having a compression of from about 40 to about 120.

9. The golf ball of claim 1, wherein the ICA has an average equivalent weight of from about 200 to about 350.

10. The golf ball of claim 1, wherein the ICA has an average equivalent weight of from about 320 to about 330.

11. The golf ball of claim 1, wherein the prepolymer has an average equivalent weight of from about 420 to about 840.

12. The golf ball of claim 1, wherein the amine-terminated chain extender is selected from the group consisting of 4,4'-diamino-diphenylmethane; 3,5-diethyl-(2,4- or 2,6-) toluenediamine; 3,5-dimethylthio-(2,4- or 2,6-)toluenediamine; 3,5-diethylthio-(2,4- or 2,6-) toluenediamine; 2,2'-dichloro-3,3',5,5'-tetraethyl-4,4'-diamino-diphenylmethane; polytetramethyleneglycol-di(p-aminobenzoate); 4,4'-bis(sec-butylamino)-dicyclohexylmethane; and mixtures thereof.

13. The golf ball of claim 1, wherein the hydroxyl-terminated chain-extender is selected from the group consisting of ethylene glycol, diethylene glycol, polyethylene glycol, propylene glycol, polytetramethylene ether glycol, polyethylene propylene glycol, polyoxypropylene glycol, 2-methyl-1,3-propanediol, 1,4-butanediol, 2-methyl-1,4-butanediol, and mixtures thereof.

14. The golf ball of claim 1, wherein the core comprises a center and an outer core layer surrounding the center, wherein the center is formed from a polybutadiene composition and the outer core layer is formed from a thermoplastic composition selected from the group consisting of: ionomers; polyesters; polyester-ether elastomers; polyester-ester elastomers; polyamides; polyamide-ether elastomers, and polyamide-ester elastomers; polyurethanes, polyureas, and polyurethane-polyurea hybrids and mixtures thereof.

15. The golf ball of claim 1, wherein the core comprises a center and an outer core layer surrounding the center, wherein the center is formed from a polybutadiene composition and the outer core layer is formed from a thermoset composition selected from the group consisting of: polyurethanes, polyureas, and polyurethane-polyurea hybrids, epoxies, and mixtures thereof.

16. The golf ball of claim 1, wherein the core has a diameter of about 1.26 to about 1.60 inches.

17. The golf ball of claim 1, wherein the cover has a thickness of from about 0.020 in. to about 0.050 in.

18. The golf ball of claim 17, wherein the cover has a flexural modulus of about 10,000 psi or greater.

19. The golf ball of claim 1, wherein the ICA is reacted with the polyol-containing component and chain-extender in a weight ratio of 1.878:1.

20. The golf ball of claim 19, wherein the polyol-containing component and chain-extender are included in cover composition PC in a weight ratio of 1.265:1.

* * * * *